United States Patent [19]
> Guichard

[11] 4,282,767
[45] Aug. 11, 1981

[54] REDUCTION GEAR

[75] Inventor: Roland R. Guichard, Chaource, France

[73] Assignee: Societe pour l'Equipement de Vehicules, Issy-les-Moulineaux, France

[21] Appl. No.: 53,812

[22] Filed: Jul. 2, 1979

[51] Int. Cl.³ .............................................. F16H 1/20
[52] U.S. Cl. ......................................... 74/427; 74/410
[58] Field of Search ................. 74/789, 792, 63, 10.8, 74/10.85, 412 R, 421 A, 425, 427, 416, 410, 424.5, 606; 296/146; 15/250.3, 250.34

[56] References Cited

U.S. PATENT DOCUMENTS

| 1,949,643 | 3/1934 | Bannan | 74/421 A |
|---|---|---|---|
| 2,606,257 | 8/1952 | Briskin | 74/421 A |
| 2,868,031 | 1/1959 | Schumb | 74/425 |
| 2,910,882 | 11/1959 | Wellauer | 74/412 |
| 2,936,644 | 5/1960 | Miller | 74/421 A |
| 3,001,409 | 9/1961 | Von Fumetti | 74/606 X |
| 3,159,045 | 12/1964 | Lohr | 74/427 X |
| 3,246,538 | 4/1966 | Easton | 74/606 |
| 3,252,349 | 5/1966 | Widdrington | 74/427 |
| 3,269,204 | 8/1966 | Schleicher | 74/424.5 |
| 3,301,081 | 1/1967 | Kern | 74/421 A |
| 3,334,443 | 8/1967 | Eskra et al. | 74/606 X |
| 3,429,201 | 2/1969 | Zuccaellini | 74/427 X |
| 3,455,174 | 7/1969 | Pickles | 74/606 X |
| 3,463,029 | 8/1969 | Chow | 74/606 X |
| 3,690,194 | 9/1972 | Edwards | 74/427 |

FOREIGN PATENT DOCUMENTS

| 505594 | 9/1954 | Canada | 74/421 A |
|---|---|---|---|
| 158480 | 2/1905 | Fed. Rep. of Germany | 74/427 |
| 177341 | 3/1922 | United Kingdom | 74/427 |

Primary Examiner—C. J. Husar
Assistant Examiner—Mark A. Daugherty
Attorney, Agent, or Firm—Brisebois & Kruger

[57] ABSTRACT

A reduction gear comprises a parallelepiped-shaped casing containing a double worm input shaft engaging with two pinions. The input shaft has its worm portions of equal pitch magnitude but of opposite hand and the engaging pinions are one on each side of the shaft. Alternative positions are provided for the two pinions to enable the direction of rotation of the output shaft to be reversed. Each pinion carries an integral spur gear engaging a common ring gear on which the output shaft is carried. There is a square cover to the casing of the reduction gear and this cover has three bosses for use in mounting the reduction gear on a support frame.

13 Claims, 2 Drawing Figures

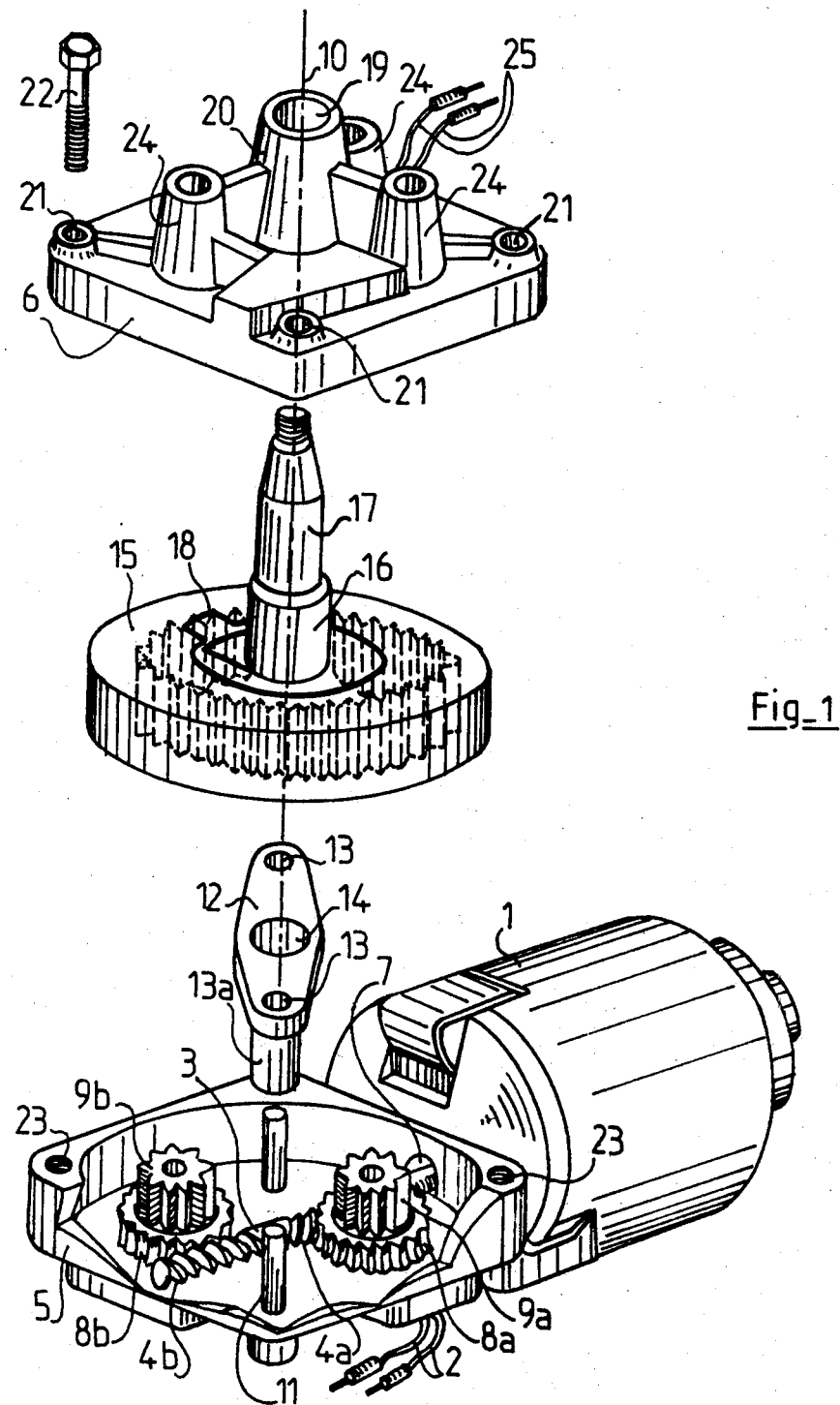
Fig_1

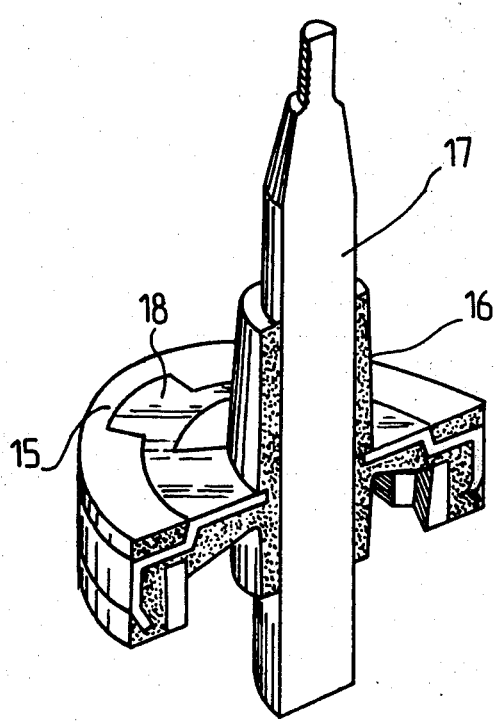
Fig_2

REDUCTION GEAR

DESCRIPTION

It is known that low power electric motors are frequently used in conjunction with a reduction gear to control ancillary systems such as, for example, the windscreen wiper of a motor vehicle. Generally one tries to reduce the dimensions of the reduction gears as far as possible but whilst having at one's disposal a high reduction ratio with a satisfactory transmission efficiency.

Generally, the constraints indicated above entail consideration of gear systems comprising a helical worm and a tangential wheel but in this case, the output shaft of the reduction gear is at a relatively great distance from the input shaft which is aligned with the rotor shaft of the motor. This displacement is particularly irksome when one wishes to use a motor always turning in the same direction to derive an output drive which is capable of being optionally rotated either in one direction or the other without changing the reduction gear; in fact, it is then necessary to consider using the reduction gear either in a first position or in a second position which is derived from the first by a rotation of 180° around the motor axis. Given the offset of the output shaft in relation to the motor axis, it happens rather frequently that the motor reduction gear can no longer be accommodated in the housing assigned to it, and this gives rise, according to the circumstances, to several casing types for the reduction gear and therefore entails an increase in the cost of the motor reduction gear which cannot be mass produced. It is therefore clear that it is preferable to adopt gearing systems for reduction gears which make it possible to reduce to a minimum, and if possible to eliminate, the distance between the motor shaft and the output shaft of the reduction gear.

Another problem also arises from attempts to increase the possible uses of the same reduction gear. In fact, mounting a reduction gear of this type on a motor vehicle is generally effected by means of a plurality of rods which are integral with the reduction gear casing and which pass through holes provided for this purpose in the vehicle body and which are bolted, after the positioning of the rods in the aforementioned holes. The holes are provided in the vehicle body by the motor manufacturer and if a given orientation of the motor reduction gear is required in relation to the said holes, it is necessary to provide a reduction gear casing for each type of orientation to accommodate not only the reduction gear but also an electric motor strapped to it. This constitutes another drawback as far as the cost is concerned.

It is an object of the present invention to provide a reduction gear making it possible to avoid the above-mentioned drawbacks.

Accordingly the present invention provides a reduction gear wherein the components of the reduction gear are arranged in a housing which is adapted to be fixed to a motor and is externally substantially symmetrical in relation to the output shaft of the reduction gear, said housing comprising a casing being closed on one of its sides which is perpendicular to its axis of symmetry by a cover which carries the means for fixing the reduction gear on a support, the housing defining a journal bearing for the output shaft of the reduction gear.

In a preferred embodiment of the reduction gear according to the invention, the cover is fixed on the casing at n points regularly distributed around the axis of symmetry of the casing at the same distance from the latter; the cover carries p fixing devices regularly distributed around the axis of symmetry of the casing at the same distance from said axis, p being an integer different from n; preferably p and n are incommensurable numbers; conveniently $n=4$ and $p=3$ in which case said casing may be a parallelepiped with a square base, the cover constituting one of the square bases of the parallelepiped; the journal bearing of the output shaft defined by the housing is arranged in a cross piece carried by projecting pins on the base of the casing which is opposite the cover.

The fixing elements for the reduction gear are advantageously formed on the said cover while making it possible to orientate the cover differently in relation to the casing. In this way, with the same design of casing and of the cover, it is possible to obtain a multiplicity of orientations of the fixing elements in relation to the reduction gear unit which makes it possible to use the same reduction gear unit for different bore arrangements provided by the vehicle makers whilst maintaining practically the same orientation of the motor axis in relation to the vehicle body in the case of a motor reduction gear unit.

According to a first variant, the reduction gear comprises an input shaft carrying a helical worm, a pinion with a fixed spindle engaging in the aforementioned worm, and a ring gear engaging with a gear fixed to the aforementioned pinion, the axis of the ring gear intersecting the axis of the worm and constituting the axis of the output shaft of the reduction gear.

According to a second variant, the reduction gear comprises an input shaft carrying two helical worms of equal pitch but of opposite hand, two identical pinions each on a respective fixed spindle and engaging on the above-mentioned two worms on either side of their common axis and each driving a gear, the two gears being identical and engaging with the same ring gear whose axis is disposed along the axis of symmetry of the two worms and of the two pinions and constitutes the output shaft of the reduction gear.

These types of gear transmission make it possible, on the one hand, to obtain an excellent transmission efficiency and, on the other hand, to provide a reduction gear whose input and output shaft axes intersect and are perpendicular with respect to each other. The choice of this type of gearing, in a motor reduction gear unit therefore makes it possible to provide a reduction gear casing which has exactly the same space requirements when the motor reduction gear is caused to turn by 180° around the rotor axis of the motor. Thus one may obtain different directions of rotation depending upon the positioning of the motor reduction gear unit even if the space reserved for the casing of the said motor reduction gear unit is very compact. The gears driven by the pinions of the reduction gear are integral with the said pinions, and disposed along the same axes between the pinions and the cover of the casing; the gears are spur gears and the ring gear of the reduction gear has a straight tooth system; the cross piece is arranged in the space existing between the gears of the reduction gear at the level of the said gears; the pins supporting the cross piece are displaced from the spindles of the pinions by a rotation around the axis of the output shaft of the reduction gear.

The choice of this particular type of gearing allows an additional advantage to be obtained by making the pins of the cross piece identical to the fixed spindles of the pinions. It is then possible to reverse the direction of rotation of the output shaft of the reduction gear for the same direction of rotation of the input shaft merely by changing the relative position within the same casing. This possibility enhances still further the potential of use of the reduction gear.

In order that the present invention may more readily be understood, one embodiment of a reduction gear in accordance with the invention will be described below by way of a purely illustrative and non-restrictive example. Reference will be made to the accompanying drawings in which:-

FIG. 1 shows in an exploded perspective a motor reduction gear according to the invention; and FIG. 2 shows in perspective a diametrical section of the reduction gear ring and of the output shaft driven thereby.

Referring to the drawings, there will be seen the electric motor 1 associated with the reduction gear according to the invention. The motor 1 is supplied by leads 2 and its rotor shaft forms the input shaft 3 of the gear mechanism. Shaft 3 comprises at its end projecting outside motor 1, two successive helical worm sections 4a, 4b, respectively. The helical worms 4a, 4b have pitches of opposite hand but of equal magnitude and are arranged within a housing of the reduction gear.

The housing comprises a casing 5 which has the external shape of a parallelepiped with a square base comprising a square bottom with its base opposite the bottom open, and a cover 6 closing off the open base of the casing 5. The projecting part of motor output shaft 3 carrying the helical worms 4a, 4b passes, via a bearing 7, through that of the side walls of the casing 5 which is adjacent to motor 1.

Casing 5 encloses two identical pinions 8a, 8b which engage with the helical worms 4a, 4b respectively. The pinions 8a, 8b are integral with, and coaxial with, spur gears 9a, 9b respectively. The spindles of assemblies 8a, 9a on the one hand and 8b, 9b on the other hand are carried by the bottom of casing 5 and extend perpendicularly to the bottom and are symmetrical in relation to the axis of symmetry 10 of the casing. This axis of symmetry 10 is perpendicular to the bottom of the casing and passes through the point of the axis of shaft 3 which is equidistant from the two pinions 8a and 8b.

The bottom of casing 5 carries two pins 11 also perpendicular to the bottom and arranged symmetrically in relation to the axis of symmetry 10 of the casing. The two pins 11 are 90° displaced from the pins of pinions 8a, 8b. Between the two pins 11 is a cross piece 12 comprising at its ends two bores 13 which are intended to accommodate the two pins 11. In its central zone the cross piece 12 comprises a bore 14 which has as its axis the axis of symmetry 10 of the casing. Cross piece 12 comprises on its lower side sleeves 13a which extend the bores 13 towards the bottom of casing 5 such that the lower portion of each sleeve 13a abuts the bottom of the casing and maintains the cross piece 12 above the plane of the upper end face of pinions 8a, 8b and the upper plane tangent to worm portions 4a, 4b of the shaft 3. Thus, cross piece 12 is located between spur gears 9a, 9b at the level of these gears.

A ring gear 15 having internal teeth coaxial with axis of symmetry 10 of the housing, engages the two spur gears 9a, 9b. The internal tooth system of ring gear 15 is a straight tooth system, and ring gear 15 is connected via a disc perpendicular to axis of symmetry 10 to a hub 16 carrying the output shaft 17 of the reduction gear. The disc connecting the toothing of ring gear 15 to hub 16 may conveniently support the fixed stop track when the motor reduction gear is intended to drive a self-parking windscreen wiper of a motor vehicle. The fixed stop track is shown at 18 in the drawing and will normally cooperate with electric contacts placed on the inner side of cover 6. When cover 6 comprises internally such optional electrical contacts to cooperate with the fixed stop track 18, it also comprises electric connection leads 25 as shown in FIG. 1.

The output shaft 17 has one of its ends engaged in the bore 14 and its other end received in a bore 19 defined by a sleeve 20 carried by the cover 6 of the reduction gear casing. The cover 6 is square and comprises at each one of its corners clearance holes 21 to accommodate bolts 22 whose threaded parts engage in corresponding bores 23 drilled in the thickness of the casing wall at the four corners thereof. The cover 6 also carries three bosses 24 to accommodate rods (not shown) which allow the motor reduction gear to be secured on the body of the vehicle to which it is to be fitted. The three bosses 24 are equiangularly arranged around axis 10, with one of these three bosses disposed at an equal distance from two adjacent bores 21.

It is clear that the axis (axis 10) of the output shaft 17 of the reduction gear intersects the axis of the input shaft (motor output shaft) 3, so that if the assembly of the motor reduction gear is rotated by 180° about the longitudinal axis of motor 1, the volume occupied by the motor reduction gear will not be changed. It will therefore be seen that the direction of rotation of the output shaft 17 may be reversed without modifying the shape of the volume occupied by the motor reduction gear, and this is very important in view of the small spaces available for such motor reduction gears near the dashboards of motor vehicles.

It is also clear that cover 6 may be orientated in four different ways in relation to casing 5 by successive rotations of 90° around axis 10. For each position, there will be obtained a different position for the fixing rods associated with bosses 24 and, in view of the angular position of the bosses as described above, it will be seen that the same cover enables twelve positions of the fixing rods to be available at 30° intervals around the axis 10. It will therefore be seen that the motor reduction gear may be used whatever the positioning of the three bosses which will always be at 120° intervals to receive the fixing rods, since it will in almost every case be possible to tolerate a variation of up to 30° in the position of the axis of motor 1 in relation to the vehicle body.

Moreover, the use of the particular gearing system contained in casing 5 allows the motion to be transmitted very efficiently. Moreover, since the pins 11 and the spindles for the pinions 8a and 8b are displaced from each other by a rotation of 90° around the axis of symmetry 10, an additional advantage may be obtained in that if the pinion/spur gear sets 8a, 9a and 8b and 9b are arranged on spindles identical to the pins 11 supporting the cross piece 12, then turning the cross piece 12 through 90° around axis 10 by engaging within bores 13 the pins 11 which previously rotatably supported the pinion/spur gear sets 8a, 9a and 8b, 9b, the direction of rotation of the output shaft 17 can be reversed. Thus, according to the positioning of the pinion/spur gear sets 8a, 9a and 8b, 9b on the four pins 11 projecting from the bottom of casing 5 (it being understood that the two pinions must always be one on either side of shaft 3) it is possible to obtain, with the same components, optional reversal of the direction of rotation of the output shaft 17 of the motor reduction gear. This particular feature allows a greater number of requirements of car manufacturers to be satisfied with the same reduction gear components, and hence the reduction of the cost of each motor reduction gear by increasing the production run.

It shall be duly understood that the embodiment described above is in no way restrictive and may give rise to any desirable modifications without thereby departing from the scope of the invention as defined in the following claims.

I claim:

1. A reduction gear unit comprising a housing which is adapted to be fixed to a motor; a drive output shaft rotatable about an axis; gear transmission members in said housing and connected to said drive output shaft; and means on said housing defining a journal bearing for said drive output shaft, said housing being externally substantially symmetrical in relation to said drive output shaft, wherein said housing comprises: (a) a casing having an open side, and a closed side which is perpendicular to the axis of rotation of said drive output shaft; (b) a cover closing said open side; (c) means on said cover for securing the reduction gear unit on a support; wherein said cover is secured on the casing at n points which are regularly interspaced around said axis of the drive output shaft at the same distance from said axis; and wherein said cover carries p securing means regularly distributed around said axis of the drive output shaft at the same distance from the said axis, p being an integer which is different from n.

2. A reduction gear according to claim 1, wherein the numbers p and n have no common factors.

3. A reduction gear according to claim 2, wherein n=4 and p=3, and wherein the housing is a parallelepiped having square bases and said cover constitutes one of the bases of said housing.

4. A reduction gear according to any one of claims 1 to 3, wherein said means defining a journal bearing for the drive output shaft includes a cross piece within said housing, pins projecting from said closed end of the housing internally of said casing and supporting said cross piece, and bore means in said cross piece to receive said output shaft rotatably therein.

5. A reduction gear according to any one of claims 1 to 3, wherein the said gear transmission members of the reduction gear comprise an input shaft rotatable about an axis; means on said input shaft defining a helical worm; a pinion meshing with said helical worm; a fixed spindle carried by said casing and rotatably supporting said helical worm; gear wheel integral with the said pinion; and a ring gear meshing with said gear wheel, wherein said ring gear has an axis intersecting the worm axis and constituting the axis of the drive output shaft of the reduction gear.

6. A reduction gear according to any one of claims 1 to 3, wherein said gear transmission members of the reduction gear comprise an input shaft rotatable about an axis; means on said input shaft defining two helical worm portions of equal pitch but of opposite hand; two identical pinions each meshing with a respective one of the two said worm portions on either side of said axis of the input shaft; two identical gear wheels each drivably connected to a respective one of said pinions, a ring gear meshing with said two identical gear wheels and having an axis of rotation which passes between and is equally spaced from said pinions and which intersects said axis of the input shaft, said axis of rotation of said ring gear being coincident with the axis of rotation of said drive output shaft.

7. A reduction gear according to claim 6, wherein each said gear wheel is fixed to a respective said pinion and is arranged coaxially therewith between the pinion and said cover of the housing.

8. A reduction gear according to claim 7, wherein said means defining a journal bearing for the drive output shaft includes a cross piece within said housing, pins projecting from said closed end of the housing internally of said casing and supporting said cross piece, and bore means in said cross piece to receive said upward shaft rotatably therein, said cross piece being arranged between said gear wheels of the reduction gear level with said gear wheels.

9. A reduction gear according to claim 7, wherein said means defining a journal bearing for the drive output shaft includes a cross piece within said housing, pins projecting from said closed end of the housing internally of said casing and supporting said cross piece, and bore means in said cross piece to receive said output shaft rotatably therein, said pins which displace the cross piece being displaced from the fixed spindles of the pinions by a rotation around the axis of said drive output shaft.

10. A reduction gear according to claim 7, wherein the said gear wheels are spur gears, and the ring gear has straight teeth.

11. A reduction gear unit comprising a housing which is adapted to be fixed to a motor; a drive output shaft rotatable about an axis; gear transmission members in said housing and connected to said drive output shaft; and means on said housing defining a journal bearing for said drive output shaft, said housing being externally substantially symmetrical in relation to said drive output shaft, wherein said housing comprises: (a) a casing having an open side, and a closed side which is perpendicular to the axis of rotation of said drive output shaft; (b) a cover closing said open side; and (c) means on said cover for securing the reduction gear unit on a support; and wherein said means defining a journal bearing for the drive output shaft includes a cross piece within said housing, pins projecting from said closed end of the housing internally of said casing and supporting said cross piece, and bore means in said cross piece to receive said output shaft rotatably therein.

12. A reduction gear unit comprising a housing which is adapted to be fixed to a motor; a drive output shaft rotatable about an axis; gear transmission members in said housing and connected to said drive output shaft; and means on said housing defining a journal bearing for said drive output shaft, said housing being externally substantially symmetrical in relation to said drive output shaft, wherein said housing comprises: (a) a casing having an open side, and a closed side which is perpendicular to the axis of rotation of said drive output shaft; (b) a cover closing said open side; (c) means on said cover for securing the reduction gear unit on a support; wherein said gear transmission members of the reduction gear comprise an input shaft rotatable about an axis; means on said input shaft defining two helical worm portions of equal pitch but of opposite hand; two identical pinions each meshing with a respective one of the two said worm portions on either side of said axis of the input shaft; two identical gear wheels each drivably connected to a respective one of said pinions, a ring gear meshing with said two identical gear wheels and having an axis of rotation which passes between and is equally spaced from said pinions and which intersects said axis of the input shaft, said axis of rotation of said ring gear being coincident with the axis of rotation of said drive output shaft; wherein each said gear wheel is fixed to a respective said pinion and is arranged coaxially therewith between the pinion and said cover of the housing; and wherein said means defining a journal bearing for the drive output shaft includes a cross piece within said housing, pins projecting from said closed end of the housing internally of said casing and supporting said cross piece, and bore means in said cross piece to receive said upward shaft rotatably therein, said cross piece being arranged between said gear wheels of the reduction gear level with said gear wheels.

13. A reduction gear unit comprising a housing which is adapted to be fixed to a motor; a drive output shaft rotatable about an axis; gear transmission members in said housing and connected to said drive output shaft; and means on said housing defining a journal bearing for said drive output shaft, said housing being externally substantially symmetrical in relation to said drive output shaft, wherein said housing comprises: (a) a casing having an open side, and a closed side which is perpendicular to the axis of rotation of said drive output shaft; (b) a cover closing said open side; (c) means on said cover for securing the reduction gear unit on a support; wherein said gear transmission members of the reduction gear comprise an input shaft rotatable about an axis; means on said input shaft defining two helical worm portions of equal pitch but of opposite hand; two identical pinions each meshing with a respective one of the two said worm portions on either side of said axis of the input shaft; two identical gear wheels each drivably connected to a respective one of said pinions, a ring gear meshing with said two identical gear wheels and having an axis of rotation which passes between and is equally spaced from said pinions and which intersects said axis of the input shaft, said axis of rotation of said ring gear being coincident with the axis of rotation of said drive output shaft; wherein each said gear wheel is fixed to a respective said pinion and is arranged coaxially therewith between the pinion and said cover of the housing; and wherein said means defining a journal bearing for the drive output shaft includes a cross piece within said housing, pins projecting from said closed end of the housing internally of said casing and supporting said cross piece, and bore means in said cross piece to receive said output shaft rotatably therein, said pins which displace the cross piece being displaced from the fixed spindles of the pinions by a rotation around the axis of said drive output shaft.

* * * * *